US011859809B1

(12) United States Patent
Jun

(10) Patent No.: US 11,859,809 B1
(45) Date of Patent: Jan. 2, 2024

(54) LAMP

(71) Applicant: HYUNDAI MOBIS CO., LTD., Seoul (KR)

(72) Inventor: Young Geun Jun, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/346,770

(22) Filed: Jul. 3, 2023

(30) Foreign Application Priority Data

Dec. 15, 2022 (KR) ........................ 10-2022-0175998

(51) Int. Cl.
*F21V 5/04* (2006.01)
*F21V 5/00* (2018.01)

(52) U.S. Cl.
CPC ................ *F21V 5/04* (2013.01); *F21V 5/007* (2013.01)

(58) Field of Classification Search
CPC .................................. F21V 5/04; F21V 5/007
See application file for complete search history.

(56) References Cited

PUBLICATIONS

DE-102013112639-A1, Na, Jan. 2015 (Year: 2015).*
DE-202020100789-U1, Lee, Apr. 2020 (Year: 2020).*

* cited by examiner

*Primary Examiner* — Mary Ellen Bowman
(74) *Attorney, Agent, or Firm* — DLA PIPER LLP (US)

(57) ABSTRACT

A lamp including an optic module including a light source part and an optic lens that outputs a first light based on light output from the light source part, and a refraction lens part that outputs a second light based on light output from the optic lens. At least a portion of the first light is refracted such that an upward/downward orientation angle thereof with respect to a front side decreases when the at least a portion of the first light is output after being input to the optic lens and passes through the optic lens, and at least a portion of the second light is refracted such that a leftward/rightward orientation angle thereof with respect to the front side decreases when the at least a portion of the second light is output after being input to the refraction lens part and passes through the refraction lens part.

18 Claims, 9 Drawing Sheets

LAMP

CROSS-REFERENCE TO RELATED APPLICATION

This application claims the benefit of priority to Korean Patent Application No. 10-2022-0175998, filed in the Korean Intellectual Property Office on Dec. 15, 2022, the entire contents of which are incorporated herein by reference.

TECHNICAL FIELD

The present disclosure relates to a lamp.

BACKGROUND

In general, headlamps that are lamps provided on a front side of a vehicle may secure a front visibility of a driver by irradiating light to a front side. An example of the headlamps may include a projection type optical system. The projection type optical system is provided through a combination of optical parts and projection lenses. The optical parts function to concentrate light around focuses of the projection lenses. The lights that gather around the focuses of the projection lenses form targeted beam patterns after passing through the projection lenses and output the beam patterns to an outside. Meanwhile, headlamps having a slimmed design having a high aesthetic feeling while forming targeted beam patterns may have been increasingly required.

Optical parts of a conventional headlamp are provided as a collimator or an elliptical optical system. Meanwhile, when the conventional optical parts are manufactured to be slimmed, optical efficiency is degraded. In this way, because a targeted light distribution performance cannot be implemented when an optical efficiency of optical parts is rapidly degraded, it is difficult to form a targeted beam pattern in a headlamp provided with the optical parts.

Accordingly, in recent years, headlamps that may implement a targeted light distribution performance while not degrading optical efficiency even when the headlamps are manufactured to be slimmed have been increasingly required.

SUMMARY

The present disclosure has been made to solve the above-mentioned problems occurring in the prior art while advantages achieved by the prior art are maintained intact.

An aspect of the present disclosure provides a lamp that may implement a targeted light distribution performance while not degrading optical efficiency even when the lamp is manufactured to be slimmed.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp includes an optic module including a light source part that irradiates light forwards, and an optic lens that outputs a first light that is the light output from the light source part after the first light is input thereto and passes therethrough, and a refraction lens part that outputs a second light that is the light output from the optic lens after the second light is input thereto and passes therethrough, at least a portion of the first light is refracted such that an upward/downward orientation angle thereof with respect to a front side decreases when the at least a portion of the first light is output after being input to the optic lens and passes through the optic lens, and at least a portion of the second light is refracted such that a leftward/rightward orientation angle thereof with respect to the front side decreases when the at least a portion of the second light is output after being input to the refraction lens part and passes through the refraction lens part.

Furthermore, the optic lens may include an optic light output surface, from which the first light is output, and of which an upward/downward curvature is formed such that the optic light output surface has a shape that is convex forwards.

Furthermore, the optic light output surface may extend along a leftward/rightward direction to have a leftward/rightward curvature that is smaller than the upward/downward curvature of the optic light output surface or to be parallel to the leftward/rightward direction, when the lamp is viewed in an upward/downward direction.

Furthermore, the refraction lens part may include a lens light output surface, from which the second light is output, and having a leftward/rightward curvature to have a shape that is convex forwards when the lamp is viewed in an upward/downward direction.

Furthermore, a front end of the lens light output surface may have an upward/downward curvature that is smaller than a leftward/rightward curvature of the lens light output surface or extends along a leftward/rightward direction to be parallel to the leftward/rightward direction, when the lamp is viewed in the leftward/rightward direction.

Furthermore, the refraction lens part may further include a lens light input surface, to which the second light is input, and the at least a portion of the second light may be refracted such that a leftward/rightward orientation angle thereof decreases, when being input to the lens light input surface, and may be refracted such that the leftward/rightward orientation angle decreases, when being output from the lens light output surface.

Furthermore, the lens light input surface may have a leftward/rightward curvature to have a shape that is convex rearwards, when the lamp is viewed in the upward/downward direction.

Furthermore, the light output from the refraction lens part may form a specific beam pattern including a plurality of segment patterns, and the light source part may include a plurality of light sources corresponding to the plurality of segment patterns, respectively.

Furthermore, the plurality of light sources may include a first light source disposed to be closest to a horizontal focus of the refraction lens part in a leftward/rightward direction, a second light source disposed on a left side of the first light source, and a third light source disposed on a right side of the first light source, and the plurality of segment patterns may include a central segment pattern corresponding to the first light source and defining a central part of the beam pattern, a left segment pattern corresponding to the second light source and formed on a left side of the central segment pattern, and a right segment pattern corresponding to the third light source and formed on a right side of the central segment pattern.

Furthermore, the light source part, the optic lens, and the refraction lens part may be sequentially disposed along the front side.

Furthermore, a plurality of refraction lens parts may be provided to be arranged along a leftward/rightward direction, and a plurality of optic modules may be provided to correspond to the refraction lens parts.

Furthermore, the plurality of refraction lens parts may be integrally formed.

Furthermore, the lamp may further include an auxiliary lens, from which the light output from the refraction lens part is output after being input thereto and passes therethrough, and the auxiliary lens may extend in the leftward/rightward direction to have a shape that is convex forwards.

Furthermore, the plurality of refraction lens parts may include a (1-1)-th refraction lens part and a (1-2)-th refraction lens part that are arranged to be adjacent to each other in the leftward/rightward direction, a light output from the (1-1)-th refraction lens part may form a plurality of (1-1)-th segment patterns, a light output from the (1-2)-th refraction lens part may form a plurality of (1-2)-th segment patterns, and the plurality of (1-1)-th segment patterns and the plurality of (1-2)-th segment patterns may be alternately arranged along the leftward/rightward direction to form a first beam pattern.

Furthermore, the plurality of refraction lens parts may further include a (2-1)-th refraction lens part and a (2-2)-th refraction lens part that are arranged to be adjacent to each other in the leftward/rightward direction, a light output from the (2-1)-th refraction lens part may form a plurality of (2-1)-th segment patterns, a light output from the (2-2)-th refraction lens part may form a plurality of (2-2)-th segment patterns, the plurality of (2-1)-th segment patterns and the plurality of (2-2)-th segment patterns may be alternately arranged along the leftward/rightward direction to form a second beam pattern, and the first beam pattern and the second beam pattern may be arranged along an upward/downward direction.

Furthermore, the plurality of optic modules may include a (1-1)-th optic module, a (1-2)-th optic module, a (2-1)-th optic module, and a (2-2)-th optic module corresponding to the (1-1)-th refraction lens part, the (1-2)-th refraction lens part, the (2-1)-th refraction lens part, and the (2-2)-th refraction lens part, heights of one or more of a center of the (1-1)-th optic module and a center of the (1-2)-th optic module in the upward/downward direction may be different, and heights of one or more of a center of the (2-1)-th optic module and a center of the (2-2)-th optic module in the upward/downward direction may be different.

Furthermore, the plurality of refraction lens parts may further include a (2-1)-th refraction lens part and a (2-2)-th refraction lens part that are arranged to be adjacent to each other in the leftward/rightward direction, a light output from the (2-1)-th refraction lens part may form a plurality of (2-1)-th segment patterns, a light output from the (2-2)-th refraction lens part may form a plurality of (2-2)-th segment patterns, the plurality of (2-1)-th segment patterns and the plurality of (2-2)-th segment patterns may be alternately arranged along the leftward/rightward direction to form a second beam pattern, and at least a portion of the first beam pattern and at least a portion of the second beam pattern may overlap each other.

Furthermore, the plurality of optic modules may include a (1-1)-th optic module, a (1-2)-th optic module, a (2-1)-th optic module, and a (2-2)-th optic module corresponding to the (1-1)-th refraction lens part, the (1-2)-th refraction lens part, the (2-1)-th refraction lens part, and the (2-2)-th refraction lens part, when a leftward/rightward spacing distance between a center of the light source part of the (1-1)-th optic module and a horizontal focus of the (1-1)-th refraction lens part is a (1-1)-th spacing distance, a leftward/rightward spacing distance between a center of the light source part of the (1-2)-th optic module and a horizontal focus of the (1-2)-th refraction lens part is a (1-2)-th spacing distance, a leftward/rightward spacing distance between a center of the light source part of the (2-1)-th optic module and a horizontal focus of the (2-1)-th refraction lens part is a (2-1)-th spacing distance, and a leftward/rightward spacing distance between a center of the light source part of the (2-2)-th optic module and a horizontal focus of the (2-2)-th refraction lens part is a (2-2)-th spacing distance, one or more of the (1-1)-th spacing distance and the (1-2)-th spacing distance may be different from one or more of the (2-1)-th spacing distance and the (2-2)-th spacing distance.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
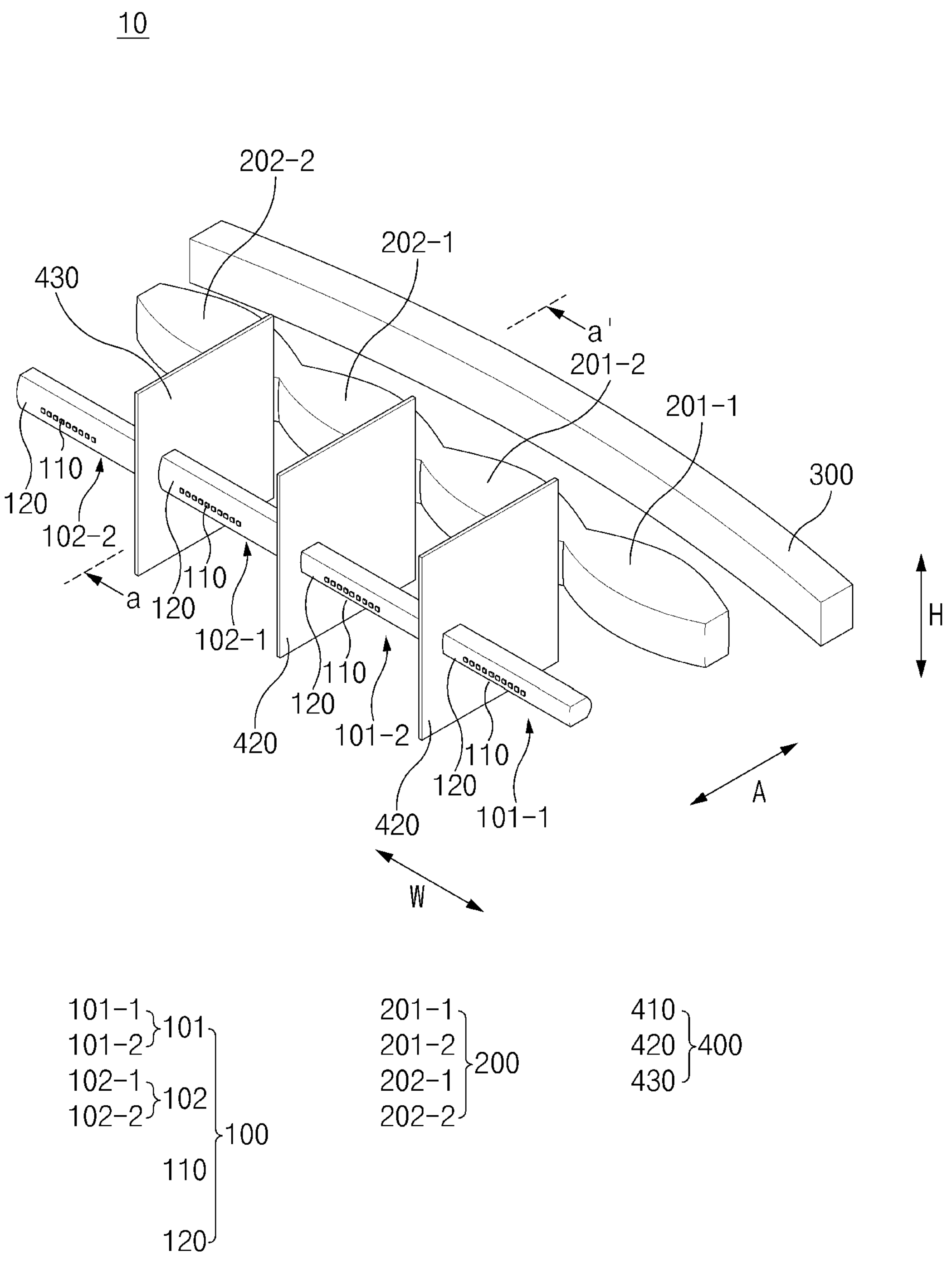
FIG. 1 is a perspective view of a lamp according to the present disclosure.

Hereinafter, some embodiments of the present disclosure will be described in detail with reference to the exemplary drawings. It is noted that, in addition of reference numerals to the components of the drawings, the same components have the same reference numerals if possible even though they are displayed on different drawings. Furthermore, when it is determined that a detailed description of related known configurations or functions hampers understanding of the embodiments of the present disclosure in a description of the embodiments of the present disclosure, the detailed description thereof will be omitted.

Furthermore, in a description of the components of the present disclosure, the terms, such as first, second, “A”, “B”, (a), and (b), may be used. The terms are for distinguishing the components from other components, and the essences, the sequences, or orders of the components are not limited by the terms. It should be understood that, when it is described that a component “is input to”, “is output from”, or “passes through” another component, the first component may be input to, be output from, be connected to the second component, but a third component may “be input between”, “be output between”, or “pass between” the other components.

Furthermore, in the specification, a forward direction of a forward/rearward direction "A" may be defined as a direction, in which light travels, and a rearward direction may be defined as an opposite direction to the forward direction. Furthermore, a leftward/rightward direction "W" may be defined as a direction, in which a plurality of optic modules 101 and 102, which will be described below, are arranged. Furthermore, an upward/downward direction "H" may be defined as a direction that is perpendicular to the leftward/rightward direction "W" and the forward/rearward direction "A".

Hereinafter, a lamp 10 according to the present disclosure will be described with reference to the drawings.

The lamp 10 may be a headlamp that may secure a visibility of a front side of a driver. The lamp 10 may be provided on a front side of the vehicle. A plurality of lamps 10 may be provided, and may be provided on the left and right sides of the front side of the vehicle, respectively. Referring to FIGS. 1 to 9, each of the lamps 10 may include an optic module 100, a refraction lens part 200, a sub lens 300, and a partition wall 400.

The optic module 100 may output light toward the refraction lens part 200. The optic module 100 may be disposed on a rear side of the refraction lens part 200. The optic module 100 may include a light source part 110 and an optic lens 120.

The light source part 110 may output the light to a front side. The light output from the light source part 110 may be named a first light. The light output from the light source part 110 may be input to the optic lens 120. Furthermore, the light source part 110 may be disposed on a rear side of the optic lens 120. The light source part 110 may include a plurality of light sources. The plurality of light sources may be spaced apart from each other to be arranged along the leftward/rightward direction "W". The plurality of light sources may include a first light source 111, a second light source 112, a third light source 113, and a fourth light source 114.

Figure 7:
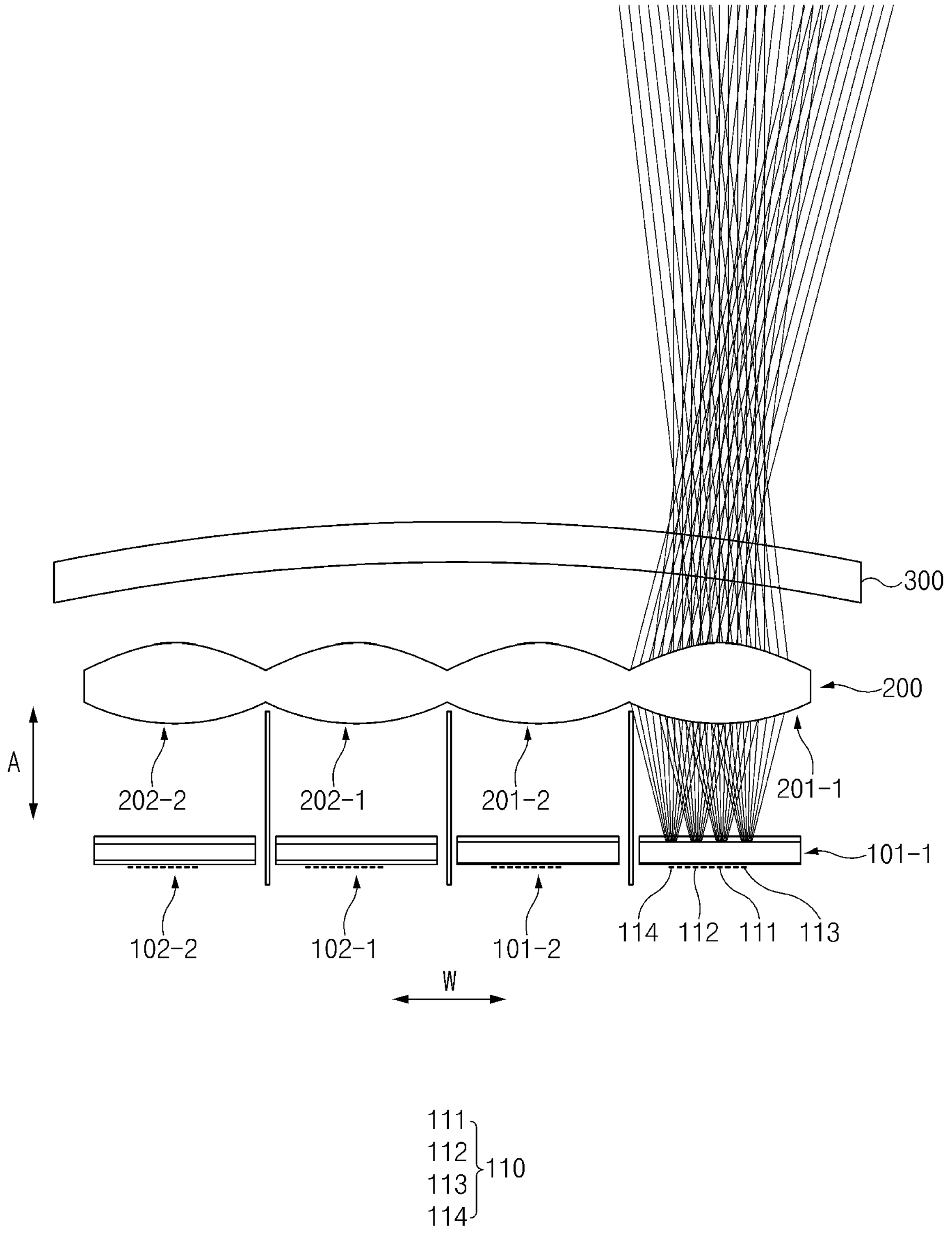
FIG. 7 is a plan view illustrating a horizontal optical path of light output from a first optic module.

Referring to FIG. 7, among the plurality of light sources, the first light source 111 may be disposed to be closest to a refractive horizontal focus that is a horizontal focus of the refraction lens part 200 in the leftward/rightward direction "W". For example, the first light source 111 may be spaced apart from the refractive horizontal focus in the leftward/rightward direction "W". A distance, by which the first light source 111 is spaced apart from the refractive horizontal focus in the leftward/rightward direction "W", may be smaller than distances, by which the second light source 112, the third light source 113, and the fourth light source 114 are spaced apart from the refractive horizontal focus in the leftward/rightward direction "W". However, the present disclosure is not limited to the example, and the location of the first light source 111 in the leftward/rightward direction "W" may be the same as the location of the refractive horizontal focus in the leftward/rightward direction "W".

The light output from the first light source 111 may form a central portion of a beam pattern. The beam pattern may be defined as a light distribution pattern that is formed after the light output from the light source part 110 sequentially passes through the optic lens 120, the refraction lens part 200, and the sub lens 300. The beam pattern may include a plurality of segment patterns. The plurality of segment patterns may include a central segment pattern that defines a central portion of the beam pattern, a left segment pattern that defines a left side of the beam pattern, and a right segment pattern that defines a right side of the beam pattern. In other words, the light output from the first light source 111 may form a central segment pattern.

The second light source 112 may be disposed on a left side of the first light source 111. The light output from the second light source 112 may form a right segment pattern. The second light source 112 may be disposed on a left side of the refractive horizontal focus. The light output from the second light source 112 may be refracted to a right side, and may be output from the sub lens 300.

In this way, when an arbitrary light source is disposed on a left side of the refractive horizontal focus, the segment pattern formed by the arbitrary light source may be formed on a right side of the central segment pattern. Moreover, a relative location of the arbitrary light source to the first light source 111 in the leftward/rightward direction "W" and a relative location of the segment pattern corresponding to the arbitrary light source to the central segment pattern in the leftward/rightward direction "W" may be reversed.

The third light source 113 may be disposed on a right side of the first light source 111. The light output from the third light source 113 may form a left segment pattern. The third light source 113 may be disposed on a right side of the refractive horizontal focus. The light output from the third light source 113 may be refracted to a left side to be output from the sub lens 300. In this way, when the arbitrary light source is disposed on a right side of the refractive horizontal focus, the segment pattern formed by the arbitrary light source may be formed on a left side of the central segment pattern.

The fourth light source 114 may be disposed on a left side of the second light source 112. For example, a spacing distance between the fourth light source 114 and the first light source 111 in the leftward/rightward direction "W" may be larger than a spacing distance between the second light source 112 and the first light source 111 in the leftward/rightward direction "W". The light output from the fourth light source 114 may form a segment pattern on a right side of the right segment pattern. The light output from the fourth light source 114 may be refracted to a right side, and may be output from the sub lens 300. For example, a degree, by which the light output from the fourth light source 114 is refracted to a right side, may be higher than a degree, the light output from the second light source 112 is refracted to a right side. Furthermore, the fourth light source 114, the second light source 112, the first light source 111, and the third light source 113 may be sequentially arranged along the rightward direction. Furthermore, the plurality of light sources may be independently controlled to be turned on and off, respectively.

Figure 2:
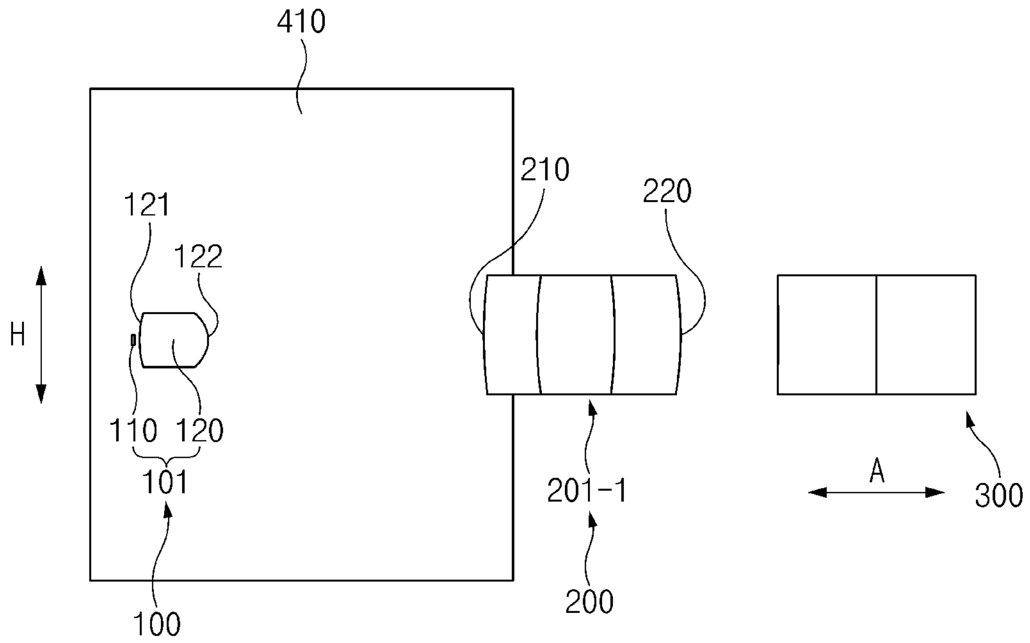
FIG. 2 is a right side view of a lamp according to the present disclosure.

Referring to FIG. 2, the first light may be output from the optic lens 120 after being input thereto and passing therethrough. The optic lens 120 may refract the first light such that an orientation angle of at least portion of the first light in the upward/downward direction "H" with respect to a front side decreases. The orientation angle of the first light in the upward/downward direction "H" with respect to the front side may be defined as an angle between a beam of the first light and an imaginary line that extends in the forward/rearward direction "A" when the lamp 10 is viewed in the leftward/rightward direction "W". In other words, the optic lens 120 may decrease a spreading angle of the first light in the upward/downward direction "H". The optic lens 120 may include an optic light input surface 121 and an optic light output surface 122.

The first light may be input to the optic light input surface 121. The optic light input surface 121 may define a rear surface of the optic lens 120. When the lamp 10 is viewed in the leftward/rightward direction "W", the optic light input surface 121 may have a shape that is convex rearwards. In other words, a curvature in the upward/downward direction "H" may be formed on the optic light input surface 121. The optic light input surface 121 may refract the input first light such that an orientation angle of at least a portion of the input first light in the upward/downward direction "H" with respect to a front side decreases.

The optic light input surface 121 may extend in the leftward/rightward direction "W". For example, when the lamp 10 is viewed in the upward/downward direction "H", a rear end of the optic light input surface 121 may have a linear shape. In other words, a curvature in the leftward/rightward direction "W" may not be formed on the optic light input surface 121. However, the present disclosure is not limited to the example, and when the lamp 10 is viewed in the upward/downward direction "H", the optic light input surface 121 may have a curvature in the leftward/rightward direction "W" that is smaller than a curvature in the upward/downward direction "H". The first light input to the optic light input surface 121 may pass through the optic lens 120.

The first light that passes through the optic lens 120 may be output from the optic light output surface 122. The optic light output surface 122 may define a front surface of the optic lens 120. Furthermore, when the lamp 10 is viewed in the leftward/rightward direction "W", the optic light output surface 122 may have a shape that is convex forwards. In other words, a curvature in the upward/downward direction "H" may be formed on the optic light output surface 122. The curvature of the optic light output surface 122 in the upward/downward direction "H" may be larger than the curvature of the optic light input surface 121 in the upward/downward direction "H".

The optic light output surface 122 may refract the first light such that an orientation angle of at least a portion of the first light, which passes through the optic lens 120, in the upward/downward direction "H" with respect to a front side decreases. In other words, the first light may be refracted twice on the optic light input surface 121 and the optic light output surface 122, respectively.

The optic light output surface 122 may extend in the leftward/rightward direction "W". For example, when the lamp 10 is viewed in the upward/downward direction "H", a front end of the optic light output surface 122 may have a linear shape. In other words, a curvature in the leftward/rightward direction "W" may not be formed on the optic light output surface 122. However, the present disclosure is not limited thereto, and when the lamp 10 is viewed in the upward/downward direction "H", the optic light output surface 122 may have a curvature in the leftward/rightward direction "W" that is smaller than a curvature in the upward/downward direction "H".

Figure 3:
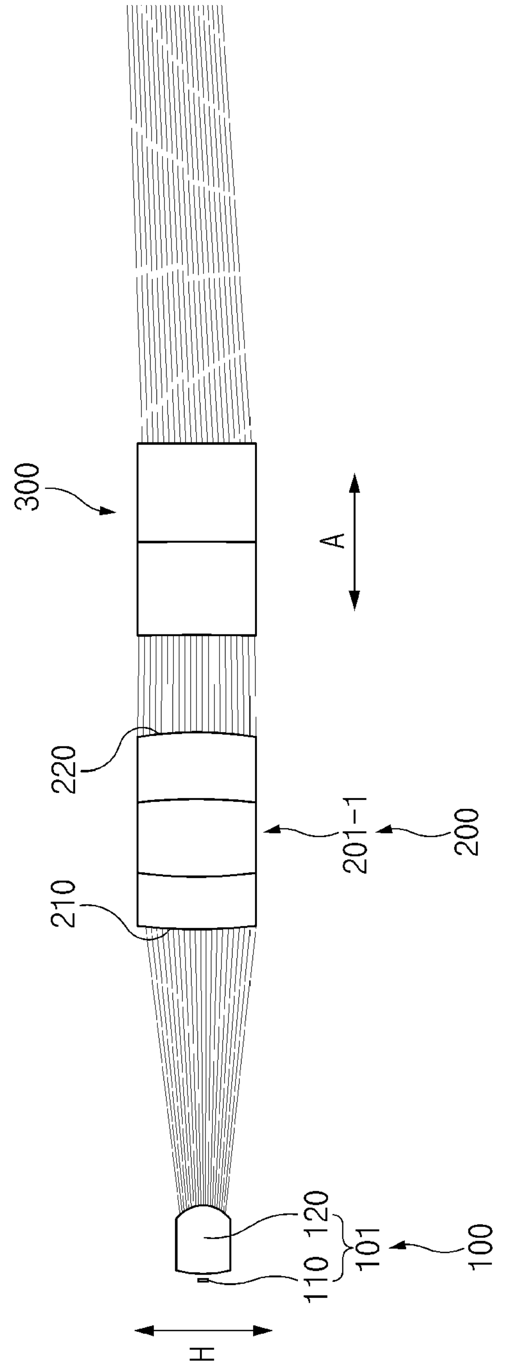
FIG. 3 is a right side view illustrating a vertical optical path of light output from a first optic module.

A plurality of optic modules 100 may be provided. The plurality of optic modules may include a first optic module 101 and a second optic module 102. Referring to FIGS. 2 and 3, a center of the first optic module 101 may be located on a lower side of a center of the refraction lens part 200. At least a portion of the light output from the light source part 110 of the first optic module 101 may be output from the sub lens 300 to be inclined upwards. The first optic module 101 may include a (1-1)-th optic module 101-1 and a (1-2)-th optic module 101-2 that are arranged in the leftward/rightward direction "W" to be adjacent to each other.

Figure 4:
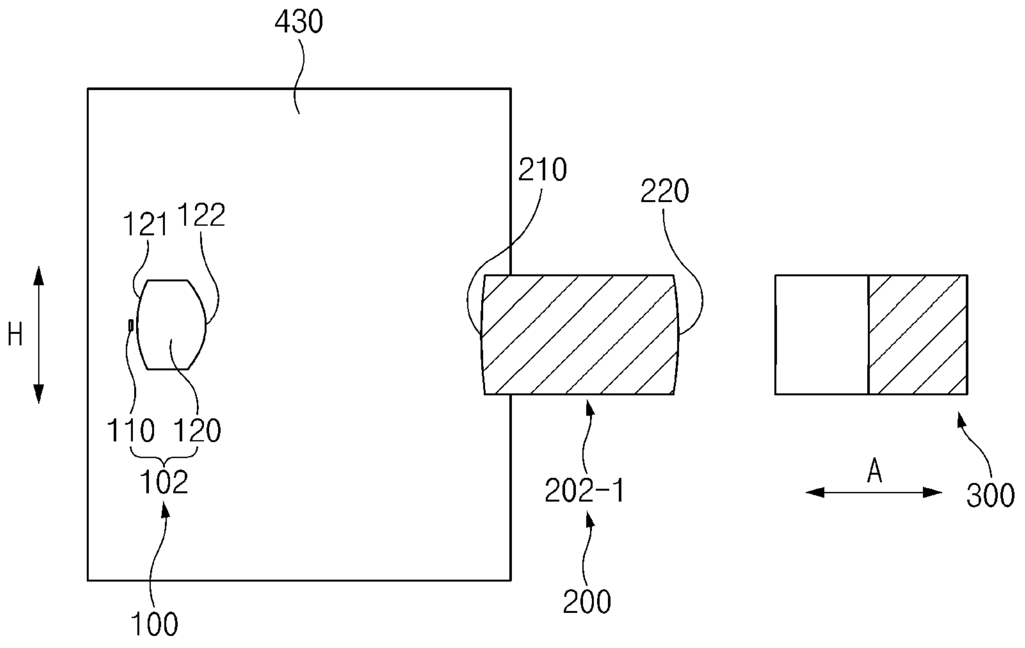
FIG. 4 is a longitudinal sectional view, taken along a-a' of FIG. 1.
Figure 5:
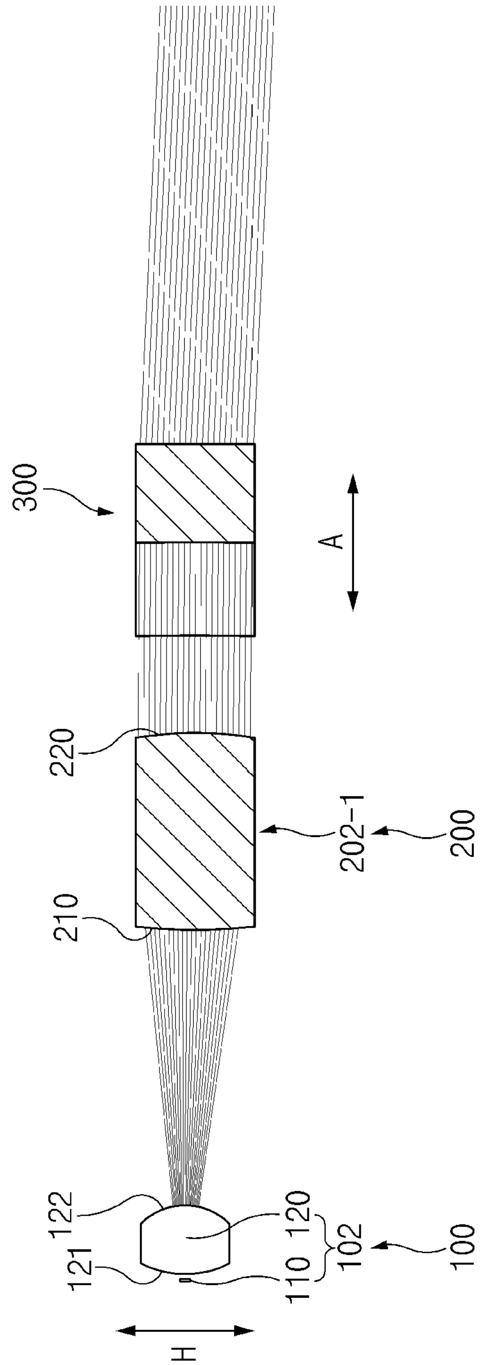
FIG. 5 is a longitudinal sectional view illustrating a vertical optical path of light output from a second optic module.

Referring to FIGS. 4 and 5, a center of the second optic module 102 may be located on an upper side of a center of the refraction lens part 200. At least a portion of the light output from the light source part 110 of the second optic module 102 may be output from the sub lens 300 to be inclined downwards. Furthermore, a thickness of the second optic module 102 in the upward/downward direction "H" may be larger than a thickness of the first optic module 101 in the upward/downward direction "H". The second optic module 102 may include a (2-1)-th optic module 102-1 and a (2-2)-th optic module 102-2 that are arranged in the leftward/rightward direction "W" to be adjacent to each other.

The (1-1)-th optic module 101-1, the (1-2)-th optic module 101-2, the (2-1)-th optic module 102-1, and the (2-2)-th optic module 102-2 may be sequentially arranged along the leftward/rightward direction "W".

The second light that is the light output from the optic module 100 may be output from the refraction lens part 200 after being input thereto and passing therethrough. The refraction lens part 200 may refract the second light such that an orientation angle of at least a portion of the second light in the leftward/rightward direction "W" with respect to a front side decreases. In other words, the refraction lens part 200 may decrease the spreading angle of the second light in the leftward/rightward direction "W". The refraction lens part 200 may include a lens light input surface 210 and a lens light output surface 220.

Figure 6:
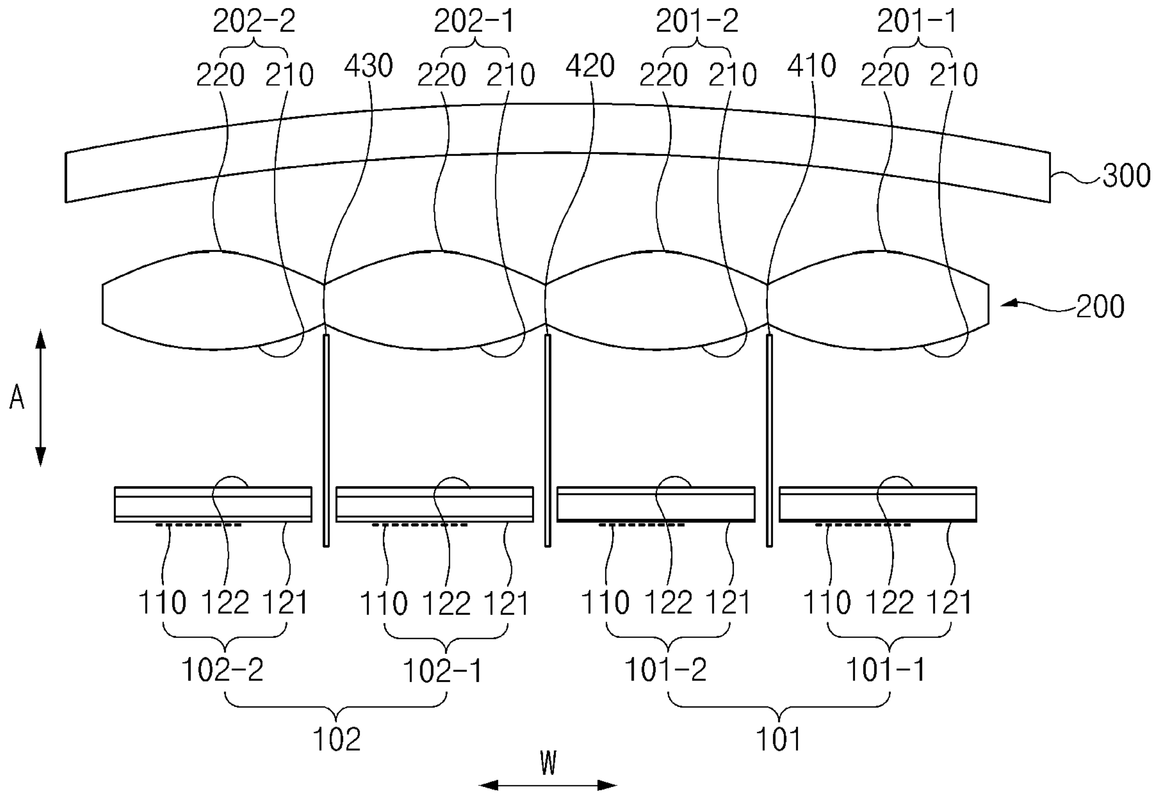
FIG. 6 is a plan view of a lamp according to the present disclosure.

Referring to FIGS. 6 and 7, the second light may be input to the lens light input surface 210. The lens light input surface 210 may define a rear surface of the refraction lens part 200. The lens light input surface 210 may extend in the leftward/rightward direction "W". Furthermore, when the lamp 10 is viewed in the upward/downward direction "H", the lens light input surface 210 may have a shape that is convex rearwards. In other words, a curvature in the leftward/rightward direction "W" may be formed on the lens light input surface 210. The lens light input surface 210 may refract the input second light such that an orientation angle of at least a portion of the input second light in the leftward/rightward direction "W" with respect to a front side decreases.

The lens light input surface 210 may extend in the upward/downward direction "H". For example, when the lamp 10 is viewed in the leftward/rightward direction "W", the lens light input surface 210 may have a shape that is convex rearwards. In other words, a curvature in the upward/downward direction "H" may be formed on the lens light input surface 210. For example, a curvature of the lens light input surface 210 in the upward/downward direction "H" may be smaller than a curvature thereof in the leftward/rightward direction "W". However, the present disclosure is not limited thereto, and when the lamp 10 is viewed in the leftward/rightward direction "W", a rear end of the lens light input surface 210 may have a linear shape. A width of the lens light input surface 210 in the upward/downward direction "H" may be smaller than a width of the lens light input surface 210 in the leftward/rightward direction "W". The second light input to the lens light input surface 210 may pass through the refraction lens part 200.

The second light that passes through the refraction lens part 200 may be output from the lens light output surface 220. The lens light output surface 220 may define a front surface of the refraction lens part 200. The lens light output surface 220 may extend in the leftward/rightward direction "W". Furthermore, when the lamp 10 is viewed in the upward/downward direction "H", the lens light output surface 220 may have a shape that is convex forwards. In other words, a curvature in the leftward/rightward direction "W" may be formed on the lens light output surface 220.

The lens light output surface 220 may refract the second light such that an orientation angle of at least a portion of the second light that passes through the refraction lens part 200 in the leftward/rightward direction "W" with respect to a front side decreases. In other words, the second light may be refracted twice on the lens light input surface 210 and the lens light output surface 220, respectively.

The lens light output surface 220 may extend in the upward/downward direction "H". For example, when the lamp 10 is viewed in the leftward/rightward direction "W", the lens light output surface 220 may have a shape that is convex forwards. In other words, a curvature in the upward/downward direction "H" may be formed on the lens light output surface 220. For example, a curvature of the lens light output surface 220 may be smaller than a curvature thereof in the leftward/rightward direction "W". However, the present disclosure is not limited thereto, and when the lamp 10 is viewed in the leftward/rightward direction "W", a front end of the lens light output surface 220 may have a linear shape. A width of the lens light output surface 220 in the upward/downward direction "H" may be smaller than a width of the lens light output surface 220 in the leftward/rightward direction "W".

A plurality of refraction lens parts 200 may be provided. The plurality of refraction lens parts 200 may include a (1-1)-th refraction lens part 201-1, a (1-2)-th refraction lens part 201-2, a (2-1)-th refraction lens part 202-1, and a (2-2)-th refraction lens part 202-2. The (1-1)-th refraction lens part 201-1, the (1-2)-th refraction lens part 201-2, the (2-1)-th refraction lens part 202-1, and the (2-2)-th refraction lens part 202-2 may correspond to the (1-1)-th optic module 101-1, the (1-2)-th optic module 101-2, the (2-1)-th optic module 102-1, and the (2-2)-th optic module 102-2, respectively. For example, the second light output from the (1-1)-th optic module 101-1 may be input to the (1-1)-th refraction lens part 201-1. Furthermore, the second light output from the (1-2)-th optic module 101-2 may be input to the (1-2)-th refraction lens part 201-2. Furthermore, the second light output from the (2-1)-th optic module 102-1 may be input to the (2-1)-th refraction lens part 202-1. Furthermore, the second light output from the (2-2)-th optic module 102-2 may be input to the (2-2)-th refraction lens part 202-2. Furthermore, the (1-1)-th refraction lens part 201-1, the (1-2)-th refraction lens part 201-2, the (2-1)-th refraction lens part 202-1, and the (2-2)-th refraction lens part 202-2, as an example, may be integrally formed.

Figure 8:
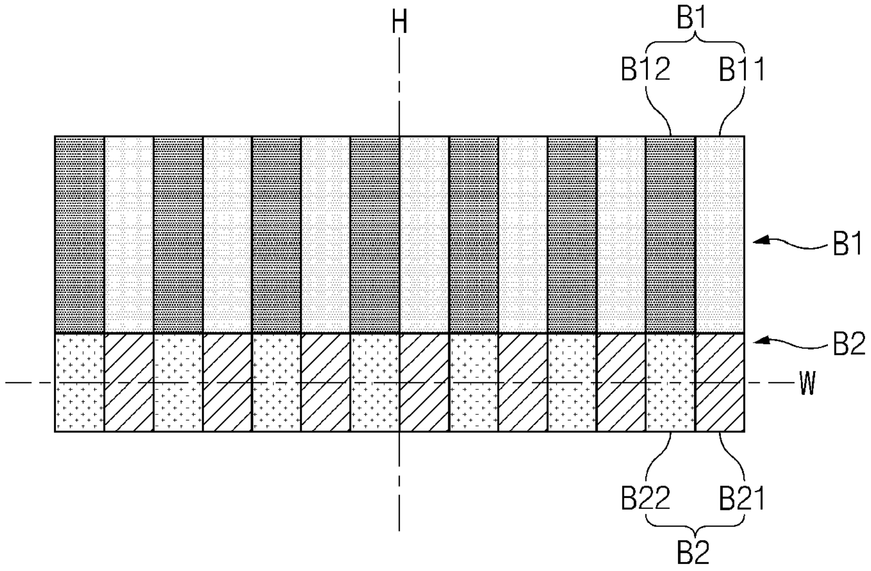
FIG. 8 is a view illustrating a state, in which a first beam pattern and a second beam pattern are arranged in an upward/downward direction.
Figure 9:
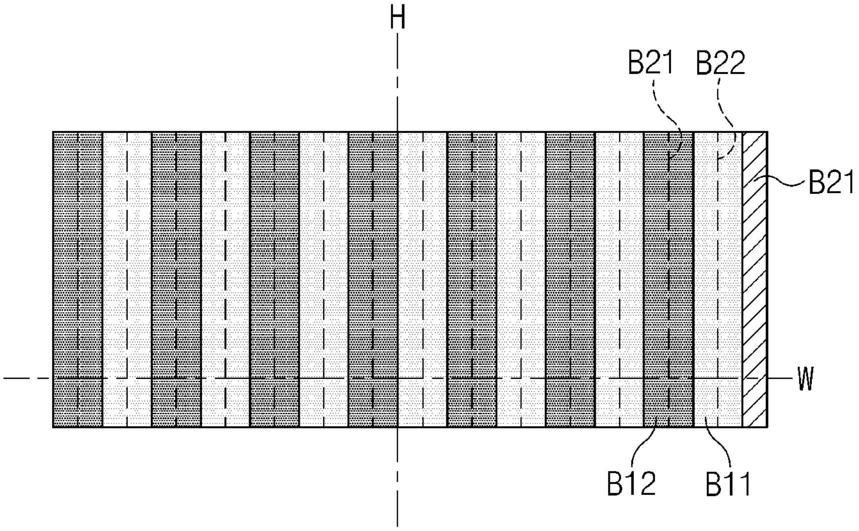
FIG. 9 is a view illustrating a state, in which a portion of a first beam pattern and a portion of a second beam pattern overlap each other.

Referring to FIGS. 8 and 9, the light output from the (1-1)-th refraction lens part 201-1 may form a plurality of (1-1)-th segment patterns B11. The plurality of (1-1)-th segment patterns B11 may be arranged to be spaced apart from each other along the leftward/rightward direction "W".

Furthermore, the light output from the (1-2)-th refraction lens part 201-2 may form a plurality of (1-2)-th segment patterns B12. The plurality of (1-2)-th segment patterns B12 may be arranged to be spaced apart from each other along the leftward/rightward direction "W". Furthermore, the plurality of (1-1)-th segment patterns B11 and the plurality of (1-2)-th segment patterns B12 may be alternately arranged along the leftward/rightward direction "W" to form a first beam pattern B1. Furthermore, a location of the first beam pattern B1 in the upward/downward direction "H" may be determined by a height of a center of the first optic module 101 in the upward/downward direction "H" with respect to a center of the refraction lens part 200.

Furthermore, the light output from the (2-1)-th refraction lens part 202-1 may form a plurality of (2-1)-th segment patterns B21. The plurality of (2-1)-th segment patterns B21 may be arranged to be spaced apart from each other along the leftward/rightward direction "W".

Furthermore, the light output from the (2-2)-th refraction lens part 202-2 may form a plurality of (2-2)-th segment patterns B22. The plurality of (2-2)-th segment patterns B22 may be arranged to be spaced apart from each other along the leftward/rightward direction "W". Furthermore, the plurality of (2-1)-th segment patterns B21 and the plurality of (2-2)-th segment patterns B22 may be alternately arranged along the leftward/rightward direction "W" to form a second beam pattern B2. Furthermore, a location of the second beam pattern B2 in the upward/downward direction "H" may be determined by a height of a center of the second optic module 102 in the upward/downward direction "H" with respect to a center of the refraction lens part 200.

Referring to FIG. 8, the first beam pattern B1 and the second beam pattern B2 may be arranged in the upward/downward direction "H". For example, as in the above-described contents, when the center of the first optic module 101 is disposed on a lower side of the center of the refraction lens part 200 and the center of the second optic module 102 is disposed on an upper side of the center of the refraction lens part 200, the first beam pattern B1 may be formed on an upper side of the second beam pattern B2.

As another example, referring to FIG. 9, when a height of the center of the first optic module 101 in the upward/downward direction "H" and a height of the center of the second optic module 102 in the upward/downward direction "H" are the same, at least portions of the first beam pattern B1 and the second beam pattern B2 may overlap each other. One or more of a (1-1)-th spacing distance and a (1-2)-th spacing distance, and one or more of a (2-1)-th spacing distance and a (2-2)-th spacing distance may be different. The (1-1)-th spacing distance may be defined as a leftward/rightward spacing distance between a center of the light source part of the (1-1)-th optic module 101-1 and a horizontal focus of the (1-1)-th refraction lens part 201-1. The (1-2)-th spacing distance may be defined as a leftward/rightward spacing distance between a center of the light source part of the (1-2)-th optic module 101-2 and a horizontal focus of the (1-2)-th refraction lens part 201-2. The (2-1)-th spacing distance may be defined as a leftward/rightward spacing distance between a center of the light source part of the (2-1)-th optic module 102-1 and a horizontal focus of the (2-1)-th refraction lens part 202-1. The (2-2)-th spacing distance may be defined as a leftward/rightward spacing distance between a center of the light source part of the (2-2)-th optic module 102-2 and a horizontal focus of the (2-2)-th refraction lens part 202-2.

Furthermore, the (1-1)-th spacing distance and the (1-2)-th spacing distance may be the same, and the (2-1)-th spacing distance and the (2-2)-th spacing distance may be the same. When the (1-1)-th spacing distance and the (2-1)-th spacing distance are different, any portion of the first beam pattern B1 and any portion of the second beam pattern B2 may overlap each other. In other words, when the (1-1)-th spacing distance and the (2-1)-th spacing distance are different, another portion of the first beam pattern B1 and another portion of the second beam pattern B2 may not overlap each other. That is, a location of the beam pattern in the leftward/rightward direction "W" may be determined according to a relative location of the center of the light source part 110 and the horizontal focus of the refraction lens part 200 in the leftward/rightward direction "W".

The light output from the refraction lens part 200 may be output from the sub lens 300 after being input thereto and passing therethrough. The sub lens 300 may extend in the leftward/rightward direction "W". Furthermore, when the lamp 10 is viewed in the upward/downward direction "H", the sub lens 300 may have a shape that is convex forwards. An orientation angle of the light input to the sub lens 300 and an orientation angle of the light output from the sub lens 300 may be the same. In other words, the sub lens 300 may maintain the orientation angle of the light output from the refraction lens part 200. The sub lens 300 may reduce a difference between intensities of light of a dark area formed by connection parts of the (1-1)-th refraction lens part 201-1, the (1-2)-th refraction lens part 201-2, the (2-1)-th refraction lens part 202-1, and the (2-2)-th refraction lens part 202-2, and a bright area around the dark area. In other words, the sub lens 300 may reduce different textures of the dark area and the bright area of the beam pattern by reducing the intensity of the light output from the refraction lens part 200. The sub lens 300 may be disposed on a front side of the refraction lens part 200.

The partition wall 400 may prevent the second lights output from the (1-1)-th optic module 101-1, the (1-2)-th optic module 101-2, the (2-1)-th optic module 102-1, and the (2-2)-th optic module 102-2 from interfering with each other. The partition wall 400 may include a first partition wall 410, a second partition wall 420, and a third partition wall 430.

The first partition wall 410 may prevent the second lights output from the (1-1)-th optic module 101-1 and the (1-2)-th optic module 101-2 from interfering with each other. The first partition wall 410 may be disposed between the (1-1)-th optic module 101-1 and the (1-2)-th optic module 101-2.

The second partition wall 420 may prevent the second lights output from the (1-2)-th optic module 101-2 and the (2-1)-th optic module 102-1 from interfering with each other. The second partition wall 420 may be disposed between the (1-2)-th optic module 101-2 and the (2-1)-th optic module 102-1.

The third partition wall 430 may prevent the second lights output from the (2-1)-th optic module 102-1 and the (2-2)-th optic module 102-2 from interfering with each other. The third partition wall 430 may be disposed between the (2-1)-th optic module 102-1 and the (2-2)-th optic module 102-2.

The lamp according to the present disclosure may implement a targeted light distribution performance while not degrading optical efficiency even when the lamp is manufactured to be slimmed.

In addition, the lamp according to the present disclosure may give a high aesthetic feeling to a person who views the lamp.

Even when it has been described above that all the components that constitute the embodiments of the present disclosure are combined into one or are combined to be operated, the present disclosure is not limited to the embodiments. That is, all the components may be selectively combined into one to be operated with a range of the purpose of the present disclosure. Further, because the above-described terms, such as "comprising", "including", or "having" mean that the corresponding components may be included unless particularly described in an opposite way, it should be construed that another component is not excluded but may be further included. Unless defined differently, all the terms including technical or scientific terms have the same meanings as those generally understood by an ordinary person in the art, to which the present disclosure pertains. The generally used terms such as the terms defined in advance should be construed to coincide with the context meanings of the related technologies, and should not be construed as ideal or excessively formal meanings unless defined explicitly in the present disclosure.

The above description is a simple exemplification of the technical spirits of the present disclosure, and the present disclosure may be variously corrected and modified by those skilled in the art to which the present disclosure pertains without departing from the essential features of the present disclosure. Accordingly, the embodiments disclosed in the present disclosure is not provided to limit the technical spirits of the present disclosure but provided to describe the present disclosure, and the scope of the technical spirits of the present disclosure is not limited by the embodiments. Accordingly, the technical scope of the present disclosure should be construed by the attached claims, and all the technical spirits within the equivalent ranges fall within the scope of the present disclosure.

What is claimed is:

1. A lamp comprising:

an optic module comprising a light source part configured to irradiate light and an optic lens configured to input the light output from the light source part and output a first light; and a refraction lens part configured to input the first light and output a second light, wherein:

at least a portion of the first light is refracted such that an upward/downward orientation angle thereof with respect to a front side decreases when the at least a portion of the first light is output, and at least a portion of the second light is refracted such that a leftward/rightward orientation angle thereof with respect to the front side decreases when the at least a portion of the second light is output.

2. The lamp of claim 1, wherein the optic lens comprises:

an optic light output surface, from which the first light is output, and in which an upward/downward curvature is formed such that the optic light output surface has a shape that is convex forwards.

3. The lamp of claim 2, wherein the optic light output surface extends along a leftward/rightward direction to have a leftward/rightward curvature that is smaller than the upward/downward curvature of the optic light output surface, or to be parallel to the leftward/rightward direction, when the lamp is viewed in an upward/downward direction.

4. The lamp of claim 1, wherein the refraction lens part comprises:

a lens light output surface, from which the second light is output, and having a leftward/rightward curvature to have a shape that is convex forwards when the lamp is viewed in an upward/downward direction.

5. The lamp of claim 4, wherein a front end of the lens light output surface has an upward/downward curvature that is smaller than a leftward/rightward curvature of the lens light output surface, or extends along a leftward/rightward direction to be parallel to the leftward/rightward direction, when the lamp is viewed in the leftward/rightward direction.

6. The lamp of claim 4, wherein:

the refraction lens part further comprises a lens light input surface to which the second light is input, and the at least a portion of the second light is refracted such that a leftward/rightward orientation angle thereof decreases when being input to the lens light input surface, and is refracted such that the leftward/rightward orientation angle decreases when being output from the lens light output surface.

7. The lamp of claim 6, wherein the lens light input surface has a leftward/rightward curvature to have a shape that is convex rearwards when the lamp is viewed in the upward/downward direction.

8. The lamp of claim 1, wherein:
the light output from the refraction lens part forms a specific beam pattern comprising a plurality of segment patterns, and
the light source part includes a plurality of light sources corresponding to the plurality of segment patterns, respectively.

9. The lamp of claim 8, wherein the plurality of light sources comprise:
a first light source disposed to be closest to a horizontal focus of the refraction lens part in a leftward/rightward direction, a second light source disposed on a left side of the first light source, and a third light source disposed on a right side of the first light source,
wherein the plurality of segment patterns comprise:
a central segment pattern corresponding to the first light source and defining a central part of the beam pattern;
a left segment pattern corresponding to the second light source and formed on a left side of the central segment pattern; and
a right segment pattern corresponding to the third light source and formed on a right side of the central segment pattern.

10. The lamp of claim 1, wherein the light source part, the optic lens, and the refraction lens part are sequentially disposed along the front side.

11. The lamp of claim 1, wherein:
a plurality of refraction lens parts are arranged along a leftward/rightward direction, and
a plurality of optic modules correspond to the refraction lens parts.

12. The lamp of claim 11, wherein the plurality of refraction lens parts are integrally formed.

13. The lamp of claim 11, further comprising:
an auxiliary lens, from which the light output from the refraction lens part is output after being input and passed therethrough,
wherein the auxiliary lens extends in the leftward/rightward direction to have a shape that is convex forwards.

14. The lamp of claim 11, wherein:
the plurality of refraction lens parts include a (1-1)-th refraction lens part and a (1-2)-th refraction lens part that are arranged to be adjacent each other in the leftward/rightward direction,
a light output from the (1-1)-th refraction lens part forms a plurality of (1-1)-th segment patterns,
a light output from the (1-2)-th refraction lens part forms a plurality of (1-2)-th segment patterns, and
the plurality of (1-1)-th segment patterns and the plurality of (1-2)-th segment patterns are alternately arranged along the leftward/rightward direction to form a first beam pattern.

15. The lamp of claim 14, wherein:
the plurality of refraction lens parts further, comprise a (2-1)-th refraction lens part and a (2-2)-th refraction lens part that are arranged to be adjacent each other in the leftward/rightward direction,
a light output from the (2-1)-th refraction lens part forms a plurality of (2-1)-th segment patterns,
a light output from the (2-2)-th refraction lens part forms a plurality of (2-2)-th segment patterns,
the plurality of (2-1)-th segment patterns and the plurality of (2-2)-th segment patterns are alternately arranged along the leftward/rightward direction to form a second beam pattern, and
the first beam pattern and the second beam pattern are arranged along an upward/downward direction.

16. The lamp of claim 15, wherein the plurality of optic modules comprise:
a (1-1)-th optic module, a (1-2)-th optic module, a (2-1)-th optic module, and a (2-2)-th optic module corresponding to the (1-1)-th refraction lens part, the (1-2)-th refraction lens part, the (2-1)-th refraction lens part, and the (2-2)-th refraction lens part, wherein:
heights of one or more of a center of the (1-1)-th optic module and a center of the (1-2)-th optic module in the upward/downward direction are different, and
heights of one or more of a center of the (2-1)-th optic module and a center of the (2-2)-th optic module in the upward/downward direction are different.

17. The lamp of claim 14, wherein the plurality of refraction lens parts further comprise a (2-1)-th refraction lens part and a (2-2)-th refraction lens part that are arranged to be adjacent to each other in the leftward/rightward direction, wherein:
a light output from the (2-1)-th refraction lens part forms a plurality of (2-1)-th segment patterns,
a light output from the (2-2)-th refraction lens part forms a plurality of (2-2)-th segment patterns,
the plurality of (2-1)-th segment patterns and the plurality of (2-2)-th segment patterns are alternately arranged along the leftward/rightward direction to form a second beam pattern, and
at least a portion of the first beam pattern and at least a portion of the second beam pattern overlap each other.

18. The lamp of claim 17, wherein the plurality of optic modules comprise:
a (1-1)-th optic module, a (1-2)-th optic module, a (2-1)-th optic module, and a (2-2)-th optic module corresponding to the (1-1)-th refraction lens part, the (1-2)-th refraction lens part, the (2-1)-th refraction lens part, and the (2-2)-th refraction lens part,
wherein when a leftward/rightward spacing distance between a center of the light source part of the (1-1)-th optic module and a horizontal focus of the (1-1)-th refraction lens part is a (1-1)-th spacing distance, a leftward/rightward spacing distance between a center of the light source part of the (1-2)-th optic module and a horizontal focus of the (1-2)-th refraction lens part is a (1-2)-th spacing distance, a leftward/rightward spacing distance between a center of the light source part of the (2-1)-th optic module and a horizontal focus of the (2-1)-th refraction lens part is a (2-1)-th spacing distance, and a leftward/rightward spacing distance between a center of the light source part of the (2-2)-th optic module and a horizontal focus of the (2-2)-th refraction lens part is a (2-2)-th spacing distance, one or more of the (1-1)-th spacing distance and the (1-2)-th spacing distance are different from one or more of the (2-1)-th spacing distance and the (2-2)-th spacing distance.

* * * * *